(12) United States Patent
Ibarra

(10) Patent No.: US 12,142,132 B1
(45) Date of Patent: Nov. 12, 2024

(54) SYSTEMS AND METHODS FOR DETECTING DETACHED SENSORS

(71) Applicant: Waites Sensor Technologies, Inc., Covington, KY (US)

(72) Inventor: Eric Joseph Ibarra, Covington, KY (US)

(73) Assignee: Waites Sensor Technologies, Inc., Covington, KY (US)

( * ) Notice: Subject to any disclaimer, the term of this patent is extended or adjusted under 35 U.S.C. 154(b) by 0 days.

(21) Appl. No.: 17/193,581

(22) Filed: Mar. 5, 2021

(51) Int. Cl.
G08B 29/02 (2006.01)
G08B 29/04 (2006.01)
H04Q 9/00 (2006.01)

(52) U.S. Cl.
CPC ............ *G08B 29/04* (2013.01); *H04Q 9/00* (2013.01); *H04Q 2209/823* (2013.01)

(58) Field of Classification Search
CPC ..... G08B 29/04; H04Q 9/00; H04Q 2209/823
See application file for complete search history.

(56) References Cited

U.S. PATENT DOCUMENTS

| | | | | |
|---|---|---|---|---|
| 5,260,689 A * | 11/1993 | Meyers | ................ | A63C 11/005 340/521 |
| 6,513,386 B2 * | 2/2003 | Barclay | ............... | G01M 13/045 73/649 |
| 8,355,316 B1 * | 1/2013 | Lushear | .............. | H04L 43/0817 370/242 |
| 8,629,771 B2 * | 1/2014 | Anderson | ............. | G01S 5/0018 340/552 |
| 9,734,706 B2 * | 8/2017 | Moon | .................... | A61B 5/033 |
| 9,759,636 B2 * | 9/2017 | Murphy | ............ | H04W 56/0015 |
| 10,402,765 B1 * | 9/2019 | Lushear | ............... | G06Q 30/016 |
| 10,748,406 B2 * | 8/2020 | Boerhout | ............... | G08B 21/18 |
| 2004/0197040 A1 * | 10/2004 | Walker | .................. | F16C 41/008 384/624 |
| 2005/0116824 A1 * | 6/2005 | Su | ........................ | G08B 21/182 340/539.26 |
| 2005/0118703 A1 * | 6/2005 | Su | ......................... | C12M 41/48 435/286.1 |
| 2008/0144693 A1 * | 6/2008 | Sato | ....................... | G01K 15/00 374/1 |

(Continued)

*Primary Examiner* — Steven Lim
*Assistant Examiner* — Son M Tang
(74) *Attorney, Agent, or Firm* — Butler Snow LLP; Jon E. Holland

(57) ABSTRACT

A system detects when sensors have become detached from equipment being monitored by the sensors. At least one sensor, such as a temperature sensor or an accelerometer, is mounted or otherwise positioned on equipment for monitoring operation of the equipment, and the sensor is coupled to a controller that may be configured to receive sensor data from the sensor. Based on the sensor data or otherwise, the controller is configured to detect when the sensor has become inadvertently detached from the equipment being monitored and notifies a user in response to such detection. The user may then take corrective action, such as reattaching the sensor to the equipment or replacing the sensor. Thus, detachment of the sensor from the equipment being monitored may be quickly detected and remedied, thereby reducing the amount of time that a sensor is unknowingly providing inaccurate information about the operation of the equipment.

21 Claims, 7 Drawing Sheets

(56) References Cited

U.S. PATENT DOCUMENTS

| | | | | |
|---|---|---|---|---|
| 2010/0076714 | A1* | 3/2010 | Discenzo | H02N 2/181 |
| | | | | 310/319 |
| 2011/0006992 | A1* | 1/2011 | Cha | G06F 1/1666 |
| | | | | 345/169 |
| 2013/0176134 | A1* | 7/2013 | Kinugawa | G08B 5/00 |
| | | | | 340/684 |
| 2014/0257722 | A1* | 9/2014 | Wilson | H02P 29/64 |
| | | | | 702/58 |
| 2015/0310723 | A1* | 10/2015 | Pinkerton | G08B 21/182 |
| | | | | 340/870.09 |
| 2017/0063117 | A1* | 3/2017 | Ban | H02J 7/007 |
| 2018/0259386 | A1* | 9/2018 | Ueda | G01D 21/02 |
| 2019/0235470 | A1* | 8/2019 | Maekawa | G01K 15/007 |
| 2019/0235471 | A1* | 8/2019 | Maekawa | G05B 19/404 |
| 2019/0235472 | A1* | 8/2019 | Maekawa | G05B 19/404 |
| 2020/0388145 | A1* | 12/2020 | Maruyama | G01D 21/00 |
| 2021/0204881 | A1* | 7/2021 | Mou | A61B 5/0295 |
| 2021/0333308 | A1* | 10/2021 | Franceschini | H03K 17/955 |
| 2021/0359875 | A1* | 11/2021 | Hong | F25D 29/00 |
| 2022/0118854 | A1* | 4/2022 | Davis | B60L 1/003 |

\* cited by examiner

SYSTEMS AND METHODS FOR DETECTING DETACHED SENSORS

RELATED ART

Sensors are often attached to various equipment for monitoring the operation and performance of the equipment. As an example, it is common for sensors to be attached to manufacturing equipment and used to evaluate the machine condition by monitoring vibrations or temperature of the equipment for detecting fault conditions or other abnormal operation. Specifically, the sensors may be used to detect conditions or states indicating that the equipment is operating improperly or inefficiently, has experienced a fault, or is about to experience a fault.

Such sensors can sometimes malfunction or become separated from the equipment being monitored, thereby preventing the sensors from effectively detecting fault conditions or other abnormal operation of the equipment. In some cases, the inability of the sensor to effectively monitor the equipment may go undiscovered for an extended period of time during which the equipment may experience a fault or experience an abnormal condition that goes undetected.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to systems and methods for detecting when sensors have become detached from equipment being monitored by the sensors. A system in accordance with some embodiments of the disclosure has at least one sensor, such as a temperature sensor or an accelerometer, mounted or otherwise positioned on equipment for monitoring operation of the equipment. The sensor is coupled to a controller that may be configured to receive sensor data from the sensor. Based on the sensor data or otherwise, the controller is configured to detect when the sensor has become inadvertently detached from the equipment being monitored and notifies a user in response to such detection. The user may then take corrective action, such as reattaching the sensor to the equipment or replacing the sensor. Thus, detachment of the sensor from the equipment being monitored may be quickly detected and remedied, thereby reducing the amount of time that a sensor is unknowingly providing inaccurate information about the operation of the equipment.

Figure 1:
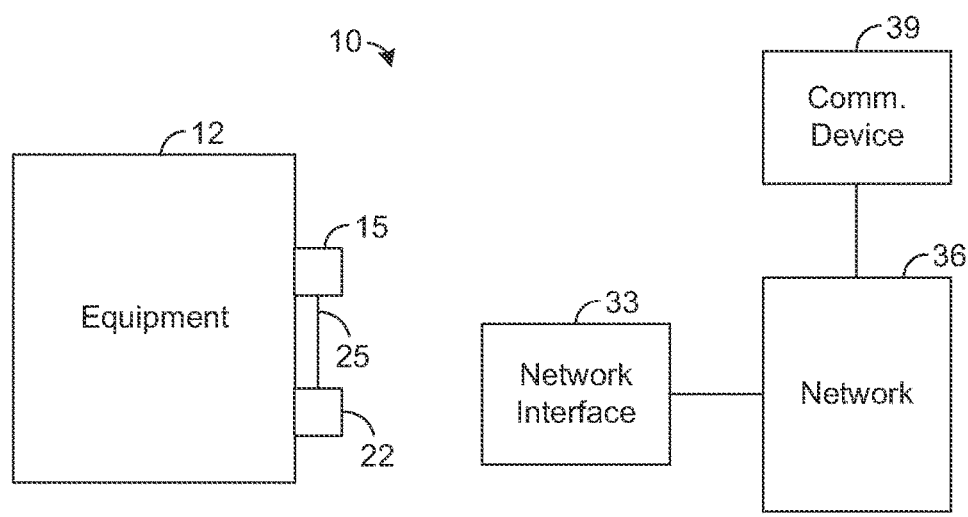
FIG. 1 is a block diagram illustrating an exemplary embodiment of a system for detecting when a sensor is detached from equipment being monitored by the sensor.

FIG. 1 depicts an exemplary embodiment of a system 10 for detecting when sensors are detached from equipment being monitored by the sensors. As shown by FIG. 1, the system 10 comprises manufacturing equipment 12 on which at least one sensor 15 is mounted or otherwise positioned. The manufacturing equipment 12 may be any type of equipment used to manufacture a product, such as a motor, gearbox, or robotic arm used to manufacture a product on an assembly line or a saw or drill that is used to cut a product or drill a hole or screw into a product. Note that it is unnecessary for the equipment to be used in manufacturing, and any type of equipment 12 may be coupled to and monitored by the sensor 15 in other embodiments.

The sensor 15 is configured to sense at least one parameter indicative of the operation of the equipment 12. As an example, the sensor 15 may be a temperature sensor (e.g., a thermistor) that is configured to sense a temperature of the equipment 12. In another example, the sensor 15 may be an accelerometer or other type of sensor for measuring vibrations or other types of accelerations or motion of the equipment 12. If the sensor 15 is an accelerometer, it may be configured as a single axis accelerometer to measure acceleration along a single axis or a multi-axis accelerator to measure acceleration along multiple axes. For example, a two-axis accelerometer typically measures acceleration along a first axis and a second axis that is orthogonal to the first axis. A three-axis accelerometer typically measures acceleration along each of three axes, where each axis is orthogonal to the directions of the other two axes. Thus, a two-axis accelerometer measures acceleration in a two-dimensional (2D) plane, whereas a three-axis accelerometer measures acceleration in three-dimensional (3D) space.

Note that measurements from an accelerometer may be used to determine motion and orientation of the accelerometer. For example, acceleration measurements may be accumulated and/or integrated to determine the sensor's velocity over time. In addition, the acceleration measurements may be analyzed to determine the direction of gravity and, thus, the sensor's orientation with respect to gravity. Acceleration measurements are also indicative of vibrations, which can be analyzed to assess the operational performance of the equipment 12. As an example, the equipment 12 may be associated with various vibrational signatures that indicate certain states of the equipment 12. By comparing a vibrational pattern sensed by the sensor 15 to one or more known vibrational signatures, it can sometimes be determined whether the equipment 12 is operating correctly, has malfunctioned, or is about to fail.

As an example, the amount or extent of vibrations may increase significantly or the pattern of vibrations may otherwise change just prior to a failure, thereby enabling the failure to be predicted. The pattern (e.g., amplitude and/or frequency) of vibration may also change as a result of the equipment changing states in normal operation, thereby enabling states of the equipment 12 to be tracked over time based on measurements by the sensor 15. Such information may be useful for determine when the equipment 12 is being used for production and the efficiency at which the equipment 12 is operating or an assembly line is progressing. When the sensor 15 is used to measure temperature, readings from the sensor 15 may be similarly used to track operation of the equipment 15. For example, a significant increase in temperature may indicate that the machine has entered into a new state or is about to fail. In other embodiments, other types of sensors 15 may be used to monitor the equipment 12 as may be desired.

As shown by FIG. 1, the sensor 15 may be coupled to a controller 22 that is configured to receive sensor data from the sensor 15. As an example, the sensor 15 may be physically coupled to the controller 22 by a wire 25 or some other medium (e.g., an optical fiber) for enabling the sensor 15 to communicate with the controller 22. In other embodiments, the sensor 15 may be configured to communicate with the controller 22 wirelessly such that a physical connection is unnecessary. As shown by FIG. 1, the controller 22 may be mounted or otherwise positioned on the equipment 12 similar to the sensor 15 shown by FIG. 1. However, it is possible for the controller 22 to reside at another location. As an example, the controller 12 may be mounted on another structure (not shown) external to the equipment 12 and communicate with the sensor 15 wirelessly and/or through a network (not shown).

The controller 22 may be configured to process the sensor data provided by the sensor 15. As an example, the controller 22 may be configured to analyze the sensor data to determine various operational states of the equipment 12 as described above. If an operational problem associated with the equipment 12 is detected based on the senor data or otherwise, the controller 22 may be configured to take at least one predefined action, such as transmitting a message to a user to notify the user of the operational problem. Alternatively, the controller 22 may be configured to transmit the sensor data to another device (not shown by FIG. 1), such as a server, that analyzes the sensor data as may be desired.

Figure 2:
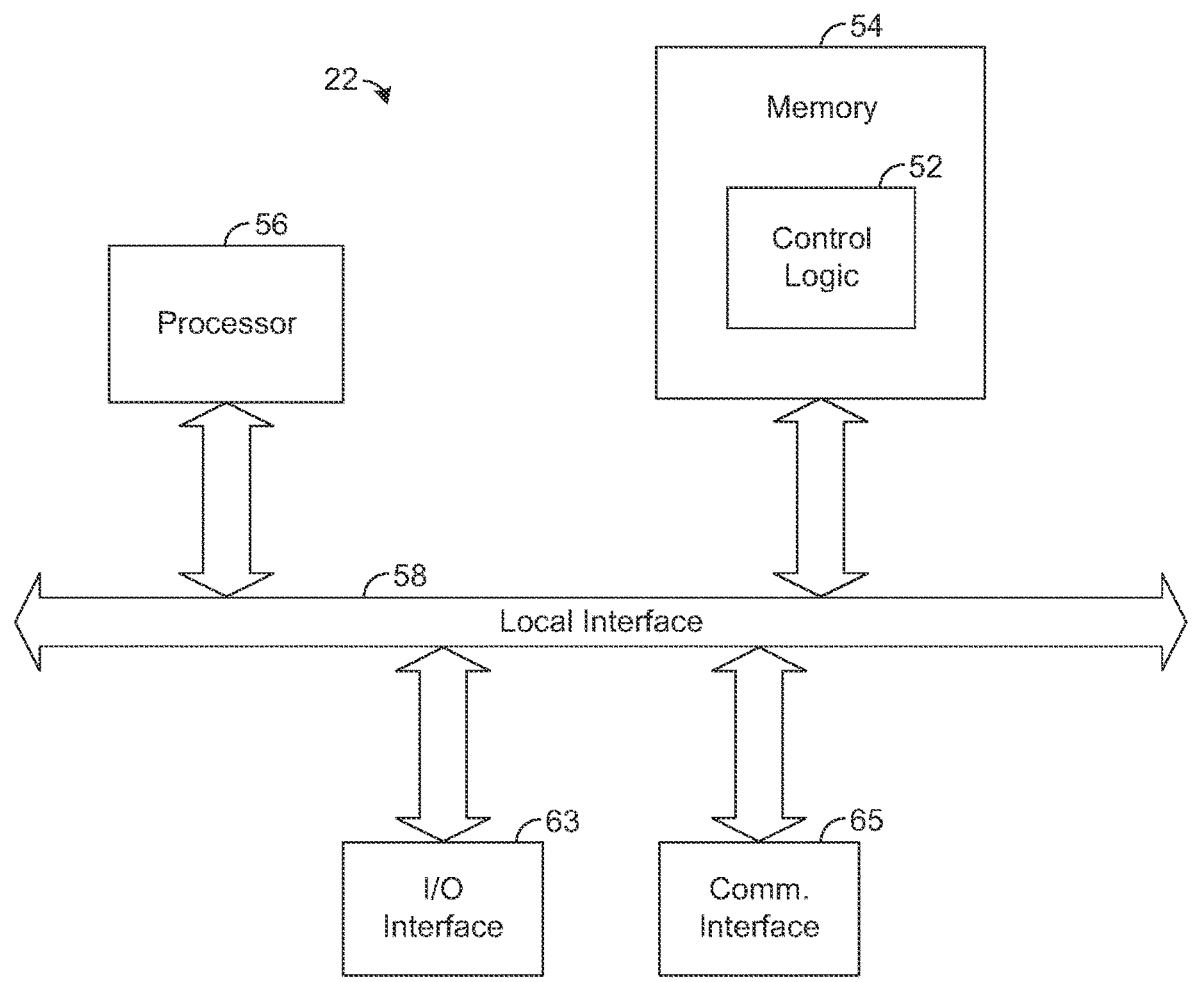
FIG. 2 is a block diagram illustrating an exemplary embodiment of a controller, such as is depicted by FIG. 1.

In some embodiments, the controller 22 may be configured to communicate with a network interface 33, such as a modem, router, gateway, or other device that is configured to communicate with a network 36, which may comprise any number of conventional networks, such as cellular networks, the Internet, or other types of networks for enabling communication with a communication device 39, such as a computer, smartphone, or other type of device that may be at a remote location relative to the equipment 12. As an example, if an operational problem is detected, the controller 22 may be configured to transmit a warning or other type of notification about the detected problem to the communication device 39 via the network 36, and the communication device 39 may display or otherwise output the message to a user. In other embodiments, the controller 22 may be configured to transmit sensor data to the communication device 39 or a server (not shown in FIG. 1), which then analyzes the sensor data to track the performance of the equipment 12. Various other configurations of the system 10 for monitoring the performance of the equipment 12 are possible. FIG. 2 depicts an exemplary embodiment of the controller 22. As shown by FIG. 2, the controller 22 comprises control logic 52 for generally controlling the operation of the controller 22, as will be described in more detail hereafter. The control logic 52 can be implemented in software, hardware, firmware or any combination thereof. In the exemplary controller 22 illustrated by FIG. 2, the control logic 52 is implemented in software and stored in memory 54 of the controller 22.

Note that the control logic 52, when implemented in software, can be stored and transported on any computer-readable medium for use by or in connection with an instruction execution apparatus that can fetch and execute instructions. In the context of this document, a "computer-readable medium" can be any means that can contain or store a computer program for use by or in connection with an instruction execution apparatus.

The exemplary controller 22 depicted by FIG. 2 comprises at least one conventional processor 56, such as a digital signal processor (DSP) or a central processing unit (CPU), that communicates to and drives the other elements within the controller 22 via a local interface 58, which can include at least one bus. As an example, when the control logic 52 is implemented in software, as shown by FIG. 2, the processor 56 may be configured to execute instructions of the control logic 52. Furthermore, an input/output (I/O) interface may be coupled to devices external to the controller 22, such as the sensor 15, for enabling communication with these external device. As shown by FIG. 2, the controller 22 may have a communication interface 65, such as at least one modem or radio, that may be used to communicate with a network. As an example, the communication interface 65 may comprise a radio frequency (RF) radio that communicates wirelessly with the network interface 33 or network 36 (FIG. 1). In other embodiments, the communication interface 65 may be coupled to the network interface 33 or the network 36 by physical media. Other configurations of the controller 22 are possible in other embodiments.

As noted above, the controller 22 is configured to sense when the sensor 15 has become detached from the equipment 12 and, in response, take at least one predefined action, such as sending a notification of the separation. Notably, sensing detachment of the sensor 15 from the equipment 12 using the sensor's measurements can be challenging in many environments.

As an example, when the sensor 15 is configured to measure temperature, the temperature measurements by the sensor 15 after detachment may be in a similar range as expected for measurements for one or more states of the equipment 12. In such an example, determining when the temperature measurements indicate detachment from the equipment 12 as opposed to normal temperature measurements of the equipment 12 can be challenging.

Figure 3:
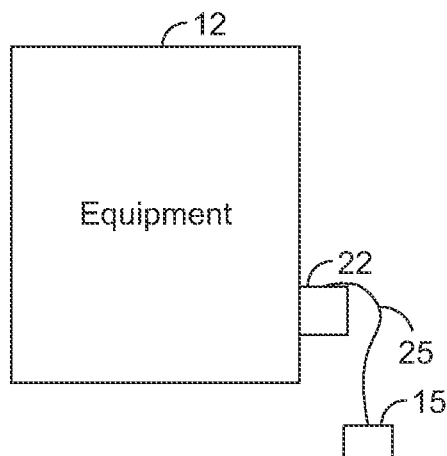
FIG. 3 is a block diagram illustrating an exemplary embodiment of the system depicted by FIG. 1 after the sensor has fallen from the equipment.

In another example, when the sensor 15 is configured to measure vibrations or other accelerations or motion of the equipment 12, such as when the sensor 15 is implemented as an accelerometer, the sensor 15 may continue to sense vibrations after becoming detached from the equipment 12. For example, after becoming detached from the equipment 12, the sensor 15 may fall on an object, such as another piece of equipment, or into an area where there are significant vibrations measured by the sensor 15. Discerning whether the sensor 15 is sensing vibrations from the equipment 12 or another source may be difficult. In some cases, the sensor 15 may be attached to the equipment 12 or the controller 22 by a tether, such as a string or a wire for carrying data or power. When the sensor 15 becomes detached from the equipment 12, it may dangle from such tether and swing back-and-forth, thereby generating vibrations or other accelerations that are sensed by the sensor 15. As an example, FIG. 3 shows the sensor 15 connected to the controller 22 by a wire 25 from which the sensor 15 swings after falling from the equipment 12. Discerning whether the sensor 15 is sensing vibrations from the equipment 12 or movement of the sensor 15 as it dangles from the wire 25 may be challenging.

In addition, even if it can be determined that the sensor 15 has become detached from the equipment, it is desirable to determine if the sensor 15 is reattached to the equipment 12 so that triggering of a certain action, such as sending of a notification regarding detachment of the sensor 15, is unnecessary. However, due to various factors, such as one or more of the difficulties described above, discerning when the sensor 15 is reattached to the equipment 12 can be challenging.

Also, there may be cases when the sensor 15 is intentionally removed from the equipment 12 and reattached to the equipment 12, such as during routine maintenance or repair of the sensor 15 or the equipment 12. It may be desirable for the controller 22 to be configured not to generate an alarm or perform other certain actions when the sensor 15 is removed for such a purpose. For illustrative purposes, an event indicating the sensor 15 has become detached from the equipment and for which it is desirable for the controller 22 to send a notification (e.g., an alarm) about such detachment shall be referred to as a "reporting event," and an event indicating that the sensor 15 has become detached from the equipment 12 and for which it is not desirable for the controller 22 to send a notification about such detachment shall be referred to hereafter as a "non-reporting event."

There are numerous techniques that the controller 22 may use in order to detect reporting events and non-reporting events. In some embodiments, the controller 22 is configured to make such detections based on the sensor data from the sensor 15 indicating the measurements taken by the sensor 15. Exemplary techniques for sensing reporting events and non-reporting events based on the sensor data from the sensor 15 will be described in more detail below. For simplicity of illustration, it will be assumed hereafter unless otherwise indicated that the sensor 15 is a vibrational or motion sensor, such as an accelerometer, for sensing vibrations or other accelerations or motions.

In some embodiments, the controller 15 is configured to determine when the sensor 15 has likely become detached from the equipment 12 and, in response, perform further evaluation to determine whether such event is a reporting event or a non-reporting event. To detect whether the sensor 15 is attached to the equipment 12, the controller 15 may be configured to determine the orientation of the sensor 15 based on the sensor data from the sensor 15 and evaluate such orientation to determine when it is outside of a normal range (e.g., an expected range when the sensor 15 is properly attached to the equipment 15).

In this regard as noted above, when the sensor 15 is implemented as an accelerometer, well-known techniques exist for analyzing accelerometer measurements to determine the direction of gravity and the sensor's orientation relative to the direction of gravity. In such an embodiment, the controller 22 may be configured to analyze the sensor measurements from the sensor 15 and determine at least one value, referred to hereafter as "orientation indicator," indicating the orientation of the sensor 15 relative to gravity or some other reference. As an example, the orientation indicator may indicate the direction of a predefined axis of the sensor 15 relative to gravity. When the sensor 15 is attached to the equipment 12, it may be expected that the orientation indicator to be within a certain normal range. If the controller 22 determines that the orientation indicator is outside of this normal range, the controller 22 may determine that the sensor 15 has likely become detached from the equipment 12 and then perform further evaluation, as described in more detail below, to determine whether such detachment is associated with a reporting event or a non-reporting event.

Figure 4:
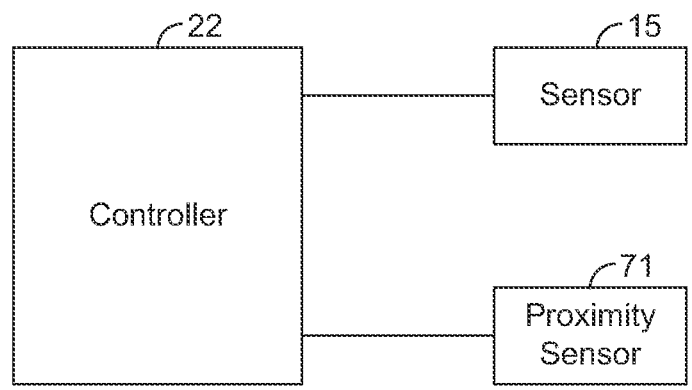
FIG. 4 is a block diagram illustrating an exemplary embodiment of a system for detecting when a sensor is detached from equipment being monitored by the sensor.

In other embodiments, other techniques for detecting when the sensor 15 has become detached from the equipment 12 are possible. As an example, as shown by FIG. 4, the system 10 may comprise a proximity sensor 71 that is configured to sense a parameter indicating a presence of the sensor 15 on the equipment 12 and to notify the controller 22 when the proximity sensor 71 detects a significant change to the proximity of the sensor 15, such as when the sensor 15 falls from or otherwise detaches from the equipment 12. There are various types of proximity sensors 71 that may be used to detect the proximity of the sensor 15, including capacitive, inductive, and optical sensors.

As an example, the proximity sensor 71 may be a capacitive sensor having an integrated electrode (not specifically shown) for use in sensing the capacitance of the junction between the sensor 15 and the intended machine mounting interface of the equipment 12 effectively providing a precise measure of proximity of the sensor to the machine surface. The sensor 15 may be positioned sufficiently close to the electrodes to affect the capacitance measured by the sensor 71. When the sensor 15 moves away from the machine interface, such as when it falls from otherwise detaches from the equipment 12, movement of the sensor 15 from the electrode changes the capacitance sensed by the sensor 71, which then notifies the controller 22 in response to the change in capacitance. Alternatively, the proximity sensor 71 may be configured to transmit capacitance measurements to the controller 22, which then determines when the sensor 15 has become detached based on such measurements.

Similarly, the proximity sensor 71 may be an inductive sensor for which the measured inductance is affected by the presence of the sensor 15 on the equipment 12. When the sensor 15 moves away from the proximity sensor 71, such as when it falls from otherwise detaches from the equipment 12, movement of the sensor 15 from the proximity sensor 71 changes the inductance sensed by the sensor 71, which then notifies the controller 22 in response to the change in inductance. Alternatively, the proximity sensor 71 may be configured to transmit inductance measurements to the controller 22, which then determines when the sensor 15 has become detached based on such measurements.

The proximity sensor 71 may alternatively be an optical sensor (e.g., infrared) having an emitter and a receiver (not specifically shown). The sensor 15 may be positioned on the equipment 12 such that it reflects a significant amount of light emitted from the emitter, thereby affecting the amount of light received by the receiver. When the sensor 15 moves away from the emitter, such as when it falls from otherwise detaches from the equipment 12, movement of the sensor 15 from the emitter changes the amount of emitted light received by the receiver, and the proximity sensor 71 then notifies the controller 22 in response to the change in received light. Alternatively, the proximity sensor 71 may be configured to transmit optical measurements to the controller 22, which then determines when the sensor 15 has become detached based on such measurements.

In some cases, the proximity sensor 71 may be configured to measure a distance between the sensor 71 and the sensor 15. The proximity sensor 71 may be configured to transmit distance measurements to the controller 22, which then determines whether the sensor 15 has become detached based on such measurements. As an example, the controller 22 may determine that the sensor 15 has become detached if the distance measured by the proximity sensor 71 significantly changes or falls outside of an expected range. If desired, the proximity sensor 71 may be configured to transmit a notification when the distance measurements change or fall outside of an expected range. In other embodiments, yet other techniques and parameters for sensing the presence of the sensor 15 and notifying the controller 22 when the sensor 15 is detached from the equipment 12 are possible.

As noted above, when the controller 22 suspects that the sensor 15 has likely detached from the equipment 12, the controller 22 may analyze the sensor data from the sensor 15 after detachment to distinguish between a reporting event and non-reporting event. There are various techniques that may be used to accomplish this.

As an example, if the sensor 15 inadvertently detaches from the equipment 12 as opposed to being intentionally removed by a technician or other user, then the sensor 15 may fall onto the floor or other surface and may be free to move around on such surface. While on the surface, the sensor 15 may shift its orientation several times by a small amount, such as a few degrees, before reaching a final resting position where the orientation does not thereafter substantially change for an extended time. Once affixed to the desired mounting surface, the proximity or distance between the sensor and machine will not substantially change unless it is intentionally or unintentionally detached. In some embodiments, based on the sensor data from the sensor 15, the controller 22 is configured to monitor the orientation of the sensor 15 after suspected detachment in effort to determine whether the changes in orientation have a pattern or "signature" consistent with the case described above where the sensor's orientation changes multiple times by a small amount before becoming substantially constant for an extended time, such as several minutes or hours. If such a signature is detected after suspected detachment of the sensor 15 from the equipment 12, the controller 22 may be configured to detect an occurrence of a reporting event and transmit a message to notify a user of the sensor detachment. That is, the controller 22 may determine that the detected detachment is associated with a reporting event and, in response, notify a user.

In another example, the sensor 15 may be attached to a tether (e.g., a wire 25), as described above and shown by FIG. 3, such that the sensor 15 will likely swing from side-to-side when it inadvertently detaches from the equipment 12. In such an example, the controller 22 may be configured to analyze the sensor data from the sensor 15 after detecting a detachment of the sensor 15 from the equipment 12 in an attempt to identify a signature consistent with a swinging motion. Such signature may be characterized by multiple occurrences of a "reversal" whereby, for each reversal, the sensor 15 moves in a direction with slowly decreasing speed until the sensor's motion transitions to a substantially opposite direction with increasing speed following the point of transition. If the controller 22 detects a signature associated with a swinging motion, the controller 22 may be configured to detect an occurrence of a reporting event and transmit a message to notify a user of the sensor detachment. That is, the controller 22 may determine that the detected detachment is associated with a reporting event and, in response, notify a user.

Notably, as the sensor 15 falls, swings, or otherwise moves, it is possible for the sensor data from the sensor 15 to exhibit velocity or positional changes that far exceed reasonable levels to expect when the sensor 15 is attached to the equipment 12 or being removed by hand. In some embodiments, the controller 22 is configured to determine at least one value indicative of the sensor's acceleration or other motion after detachment from the equipment 12 and to compare such value to a threshold. If the threshold is exceeded, thereby indicating that the sensor 15 is experiencing motion at a level far exceeding an expected level for a non-reporting event, the controller 22 may determine that a reporting event has occurred and transmit a message to notify a user of the sensor detachment.

As an example, the controller 22 may integrate acceleration measurements by the sensor 15 to determine a value indicting the sensor's velocity or change in position and compare such value to a predefined threshold. If the value remains below the threshold for at least a certain window of time (e.g., a few seconds) from the point of detachment, then the controller 22 may determine that the detected detachment is associated with a non-reporting event, such as intentional removal of the sensor 15 by a user. In such case, the controller 22 may refrain from transmitting a message for notifying a user of the detachment. However, if the value exceeds the threshold during the window, then the controller 22 may determine that the detected detachment is associated with a reporting event and, in response, transmit a message for notifying a user of the detachment.

In some embodiments, such as when the controller 22 is unable to identify a signature indicating that a reporting event has occurred, the controller 22 may analyze various data, such as sensor data from the sensor 15 or other data, to determine if the sensor 15 has been reattached to the equipment 15. If so, then the controller 22 may determine that the original detachment of the sensor 15 from the equipment 12 is associated with a non-reporting event, such as maintenance, rather than a reporting event. However, if the controller 22 is unable to confirm that the detachment is associated with a non-reporting event after expiration of a certain amount of time (e.g., several minutes or hours), then the controller 22 may assume that a reporting event has occurred and, thus, transmit a message to notify a user of the sensor detachment.

There are various techniques that can be used to determine whether the sensor 15 is attached to the equipment 12 (e.g., to determine when the sensor 15 becomes detached from the equipment 12 or reattached to the equipment 12 after detection of detachment). In some cases, the controller 22 determines whether the sensor 15 is attached based on the sensor data from the sensor 15. As an example, some equipment 12 may exhibit certain vibrational signatures that can be identified in the sensor data and used to confirm that the sensor 15 is attached to the equipment 12. Specifically, the vibrations sensed by the sensor 15 may have certain unique patterns that, if detected, can be used to confirm that the sensor 15 is attached and reading vibrations from the equipment 12. As an example, as the equipment 12 transitions from one state to the next, the level of vibration may change thereby defining a detectable pattern. For example, the equipment 12 may progress through a predefined order of states where each state is associated with a certain range of vibration levels and frequencies that persist for a predefined amount of time. In such case, the vibrations may be tracked over time to determine whether they exhibit a pattern consistent with the expected state changes.

Figure 5:
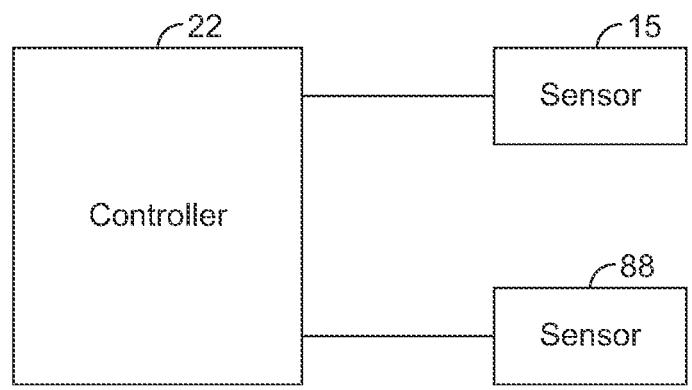
FIG. 5 is a block diagram illustrating an exemplary embodiment of a system for detecting when a sensor is detached from equipment being monitored by the sensor.

In some cases, the equipment 12 may make certain motions that cause the orientation of the sensor 15 to change in a predictable way, if the sensor 15 is indeed attached to the equipment 12 during operation. As an example, the sensor 15 may be attached to a robotic arm that makes certain repetitive motions during operation. If the pattern of motions is detected in the sensor data, then the controller 22 may be configured to determine that the sensor 15 is properly attached to the equipment 12. In other cases, the controller 22 may use data from other sources to determine whether the equipment 12 is operating and determine whether the sensor 15 is attached to the equipment 12 based on such data. As an example, as shown by FIG. 5, the controller 22 may be coupled to at least one other sensor 88 that is configured to provide data indicating whether the equipment 12 is operating. As an example, the sensor 88 may measure power consumed by the equipment 12, and the controller 22 may determine whether the equipment 12 is operating based on the amount of power consumed. In other embodiments, the sensor 88 may sense other operational parameters of the equipment 12 to enable to the controller 22 to determine when the equipment 12 is operating based on sensor data form the sensor 88. In some embodiments, the sensor 88 may be redundant to the sensor 15 or sense the same operational parameter of the equipment 12 (e.g., vibration) as the sensor 15. If the sensor data from the sensor 88 indicates an operational signature of the equipment 12, as described above for the sensor 15, then the controller 22 may determine that the equipment 12 is operating.

If the controller 22 is able to confirm that the equipment 12 is operating based on the sensor 88, then the controller 22 may be able to make a better decision about the attachment status of the sensor 15. As an example, the absence of an expected operational signature of the equipment 12 in the sensor data from the sensor 15 could occur when the sensor 15 is not attached to the equipment 12, but it also could occur when the equipment 12 is not operating. The controller 22 may use information from the sensor 88 to help distinguish between these possibilities. If the controller 22 confirms that the equipment 12 is currently operating based on the sensor 88 but is unable to identify an expected operational signature of the equipment 12 in the sensor data from the sensor 15, then the controller 22 may determine that the sensor 15 is likely not attached to the equipment 12. That is, by determining that the equipment 12 is in fact operating based on the sensor 88, the controller 22 is able to interpret the absence of an expected operational signature in the sensor data from the sensor 15 as an indication that the sensor 15 is detached.

In some embodiments, the determination about whether the equipment 12 is operating and/or whether the sensor 15 is attached to the equipment 12 may be made based on the amount of correlation that exits between the sensor data of multiple sensors 15, 88. In this regard, if the output of multiple sensors of a given type remains highly correlated over a given time window, then the controller 22 may determine that all of the sensors are attached to the equipment 12. However, if the output of one or more of the sensors deviates significantly from the output of the other sensors such that there is low correlation in the output of the one or more sensors relative to the other sensors, then it may be determined that at least one of the sensors is not attached to the equipment 12.

Figure 6:
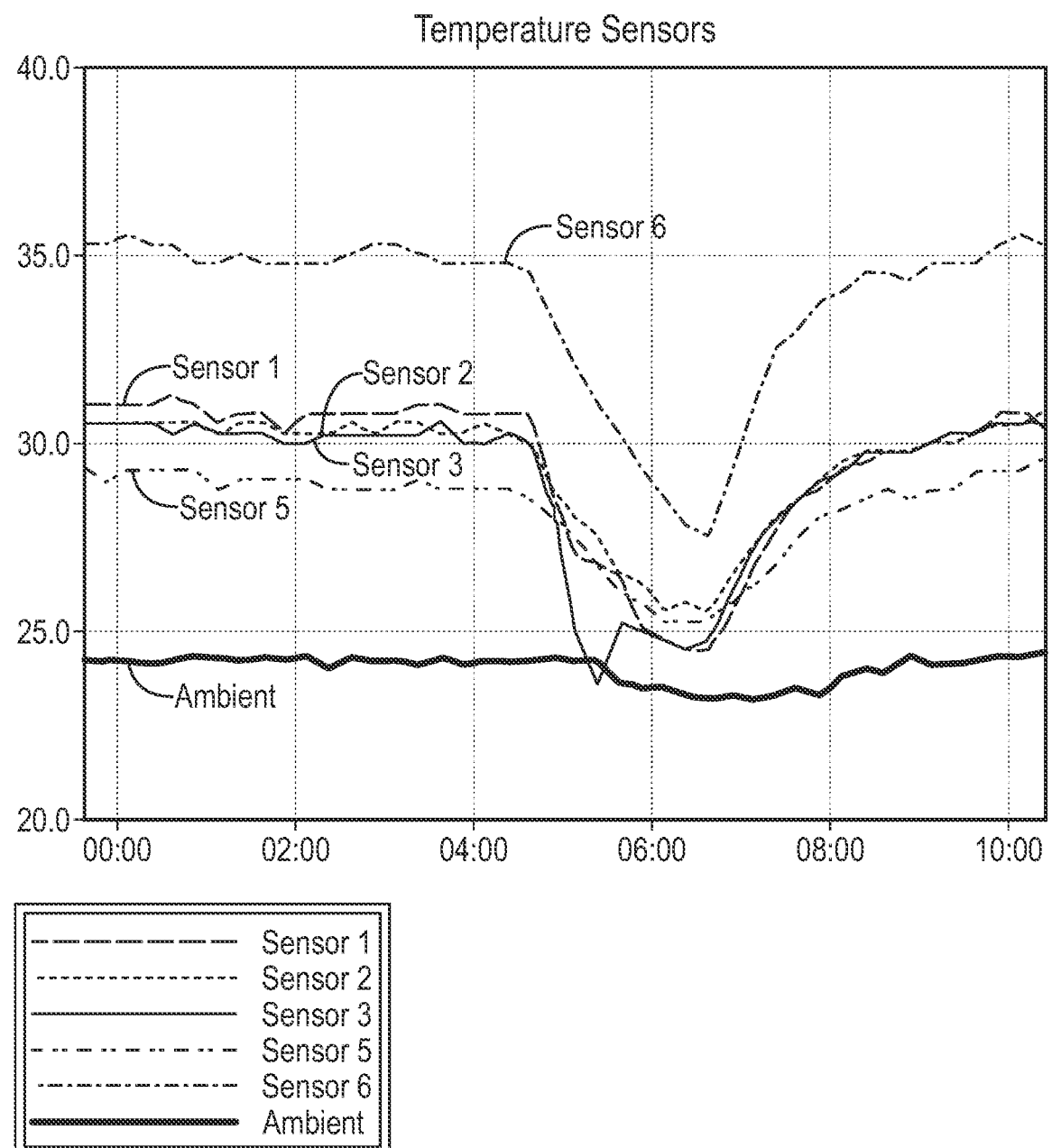
FIG. 6 is a graph depicting temperature measurements versus time for several temperature sensors attached to the same equipment.
Figure 7:
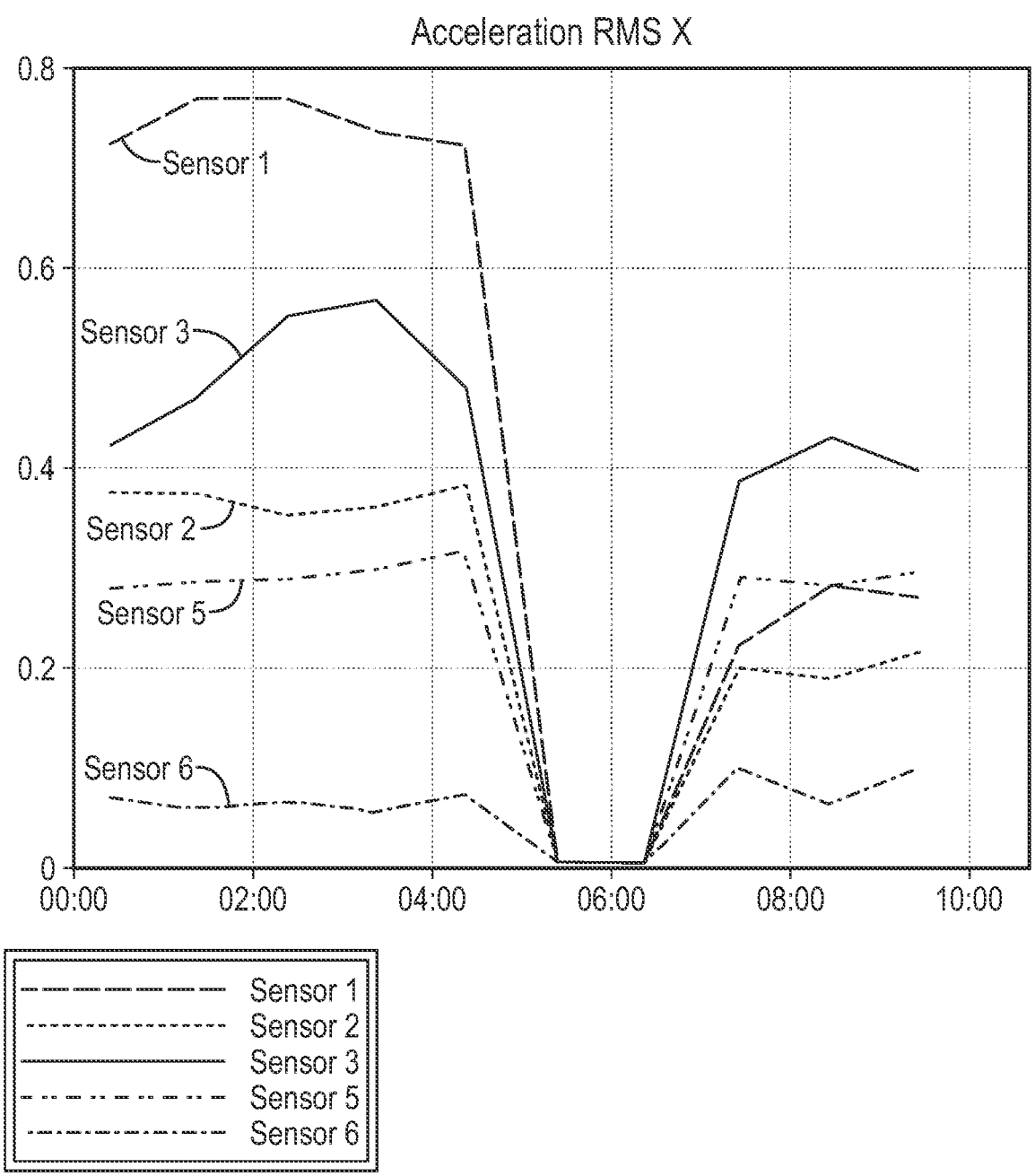
FIG. 7 is a graph depicting acceleration measurements versus time for several accelerometers attached to the same equipment.
Figure 8:
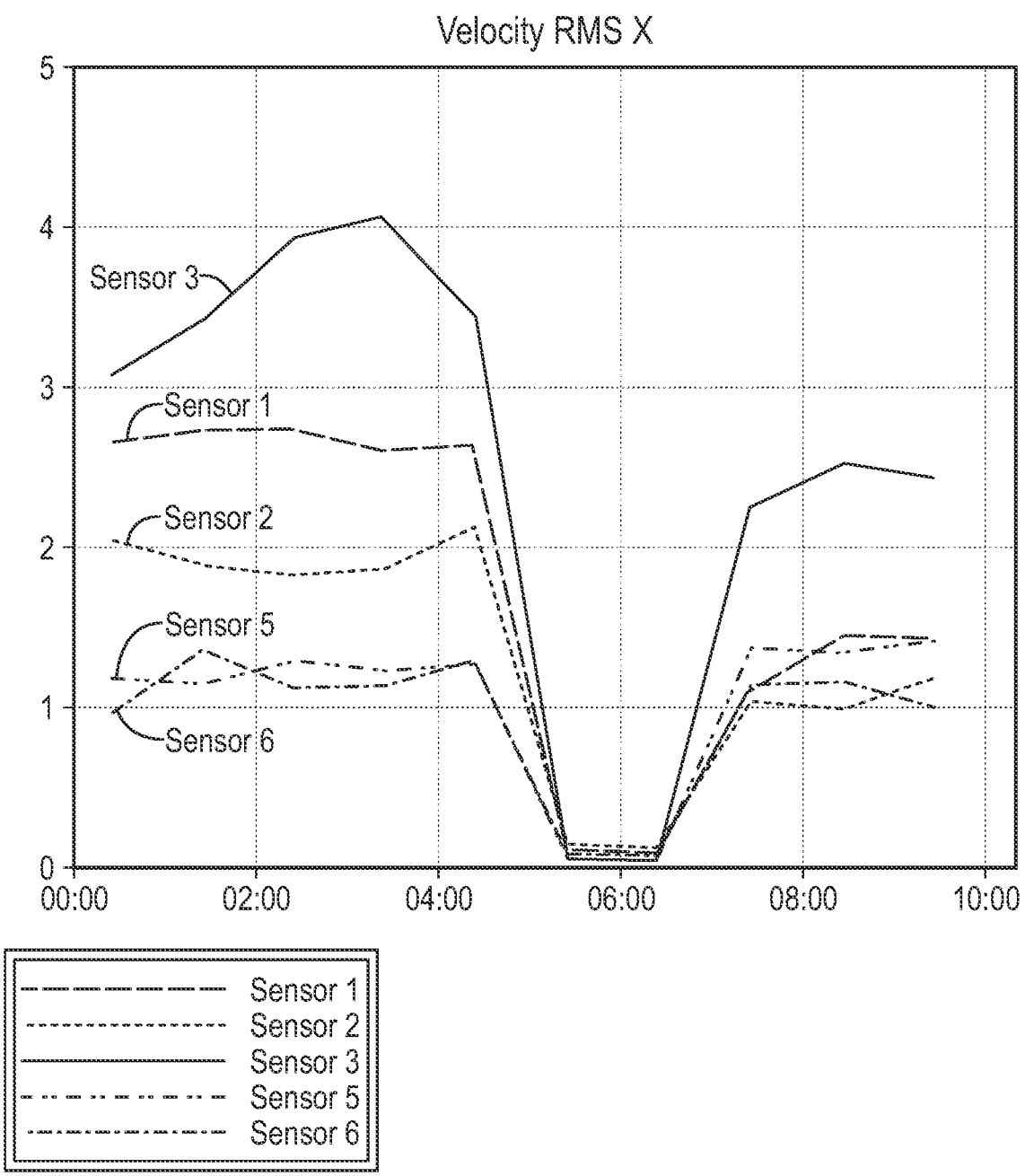
FIG. 8 is a graph depicting velocity measurements versus time for several accelerometers attached to the same equipment.
Figure 9:
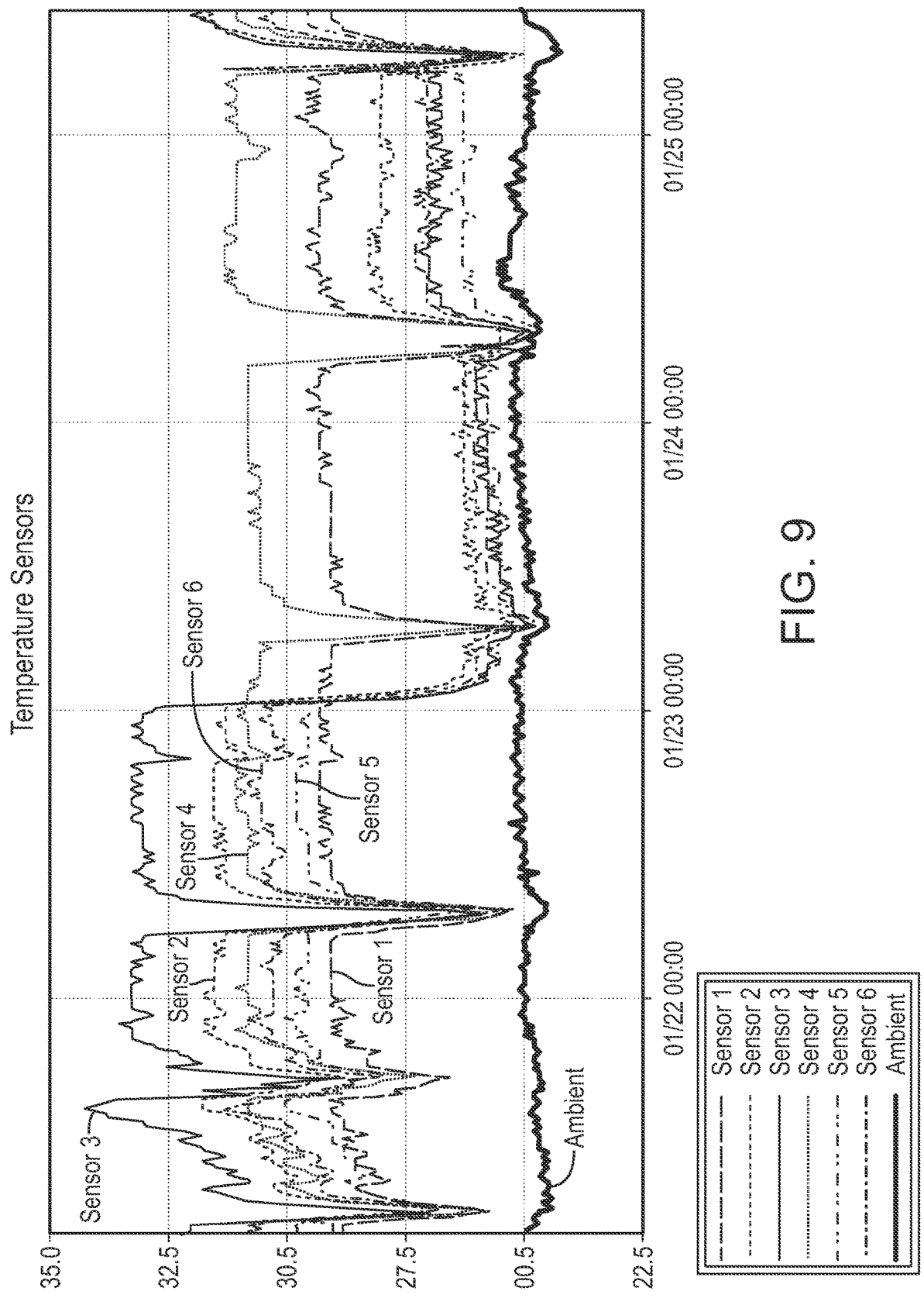
FIG. 9 is a graph depicting temperature measurements versus time for several temperature sensors where a few of the temperature sensors become detached from the equipment during the measurements.

To better illustrate the foregoing, refer to FIGS. 6-8 which respectively show temperature measurements from a group of temperature sensors and acceleration measurements and velocity measurements from a group of accelerometers over the same time period. The patterns shown by FIGS. 6-8 are consistent with the equipment 12 being turned off around 4:30 and turned back on just after 6:00.

As an example, referring to FIG. 6, when the equipment 12 is turned off, the measured temperatures begin to decrease and then later begin to increase once the equipment 12 is turned back on forming a dip in the temperature readings. The controller 22 may compare the temperature readings and determine that there is a high degree of correlation across the window of time such that it is likely that each of the sensors is attached to the equipment 12. That is, the readings from each sensor show a similar pattern such that the readings from one sensor is consistent with the readings from the other sensors. The acceleration and velocity readings shown by FIGS. 7 and 8 similarly show a high degree of correlation across the time window such that the controller 22 may determine that the accelerometers used to provide the acceleration and velocity readings are all attached to the equipment 12.

Figure 10:
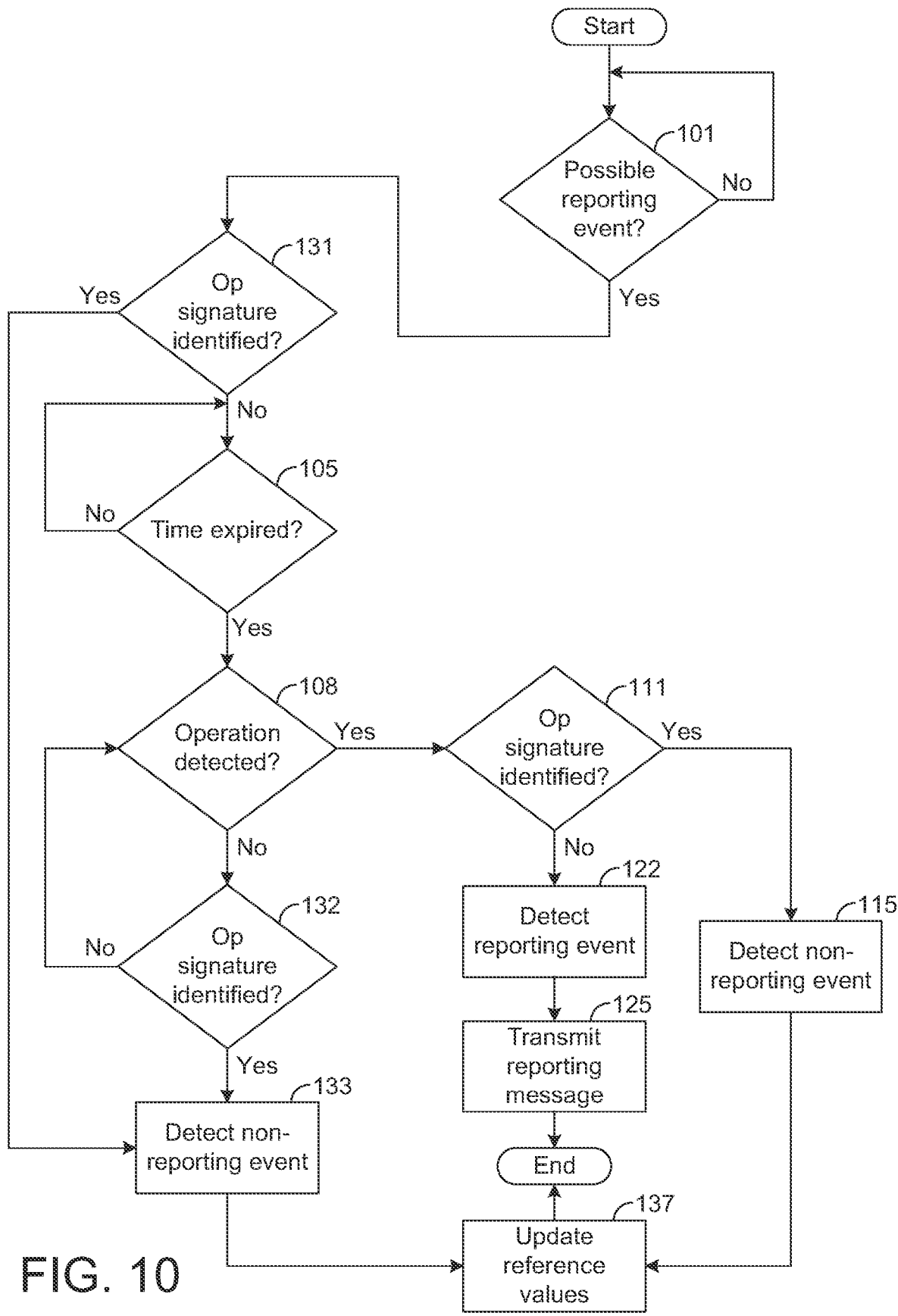
FIG. 10 is flow chart illustrating an exemplary method for detecting detachment of a sensor from equipment and for determining when to notify a user of such detachment.

Assume, however, that one or more of the temperature sensors becomes detached from the equipment 12. In such example, it would be expected that the detached sensor(s) would output readings that are no longer correlated with the other sensor(s) that remain attached to the equipment 12. As an example, refer to FIG. 10 which shows temperature readings from a plurality of temperature sensors attached to the equipment 12. As shown by FIG. 10, the readings from the sensors exhibit the same or similar pattern and thus remain highly correlated until about 01/23 00:00. Around that time, three of the sensors become detached such that their readings remain close to ambient temperature while the readings of two of the sensors significantly increase when the equipment 12 is operating. That is, the readings from the detached sensors no longer remain correlated with the readings from the sensors that are still attached to the equipment 12. In such an example, the controller 22 may determine that sensors outputting values close to ambient temperature between 01/23 00:00 and 01/24 00:00 have become detached from the equipment 12.

Note that there are various techniques and algorithms that may be used to determine whether the readings from one sensor are correlated with readings from one or more other sensors. As an example, over a period of time, the sample measurements from one sensor may be subtracted from at least one other sensor, and the difference values may be summed. Further, the sum may be compared to a threshold. If the sum is less than the threshold, then a high degree of correlation may be deemed to exist. However, if the sum is greater than the threshold, then a low degree of correlation may be deemed to exist. In other embodiments, other techniques for determining whether readings from one sensor are correlated with readings from one or more other sensors are possible.

FIG. 10 illustrates an exemplary operation of the controller 22 in monitoring one or more sensors attached to equipment 12. It should emphasized that FIG. 10 is presented for illustrative purposes and other techniques may be used to monitor one or more sensors in other embodiments.

Referring to FIG. 10, the controller 22 detects the occurrence of a possible reporting event in block 101 by sensing an event indicating that a sensor 15 may have become detached from the equipment 12. As an example, the controller 22 may detect a possible reporting event when the orientation of the sensor 15 is determined to have changed in an abnormal way, as described in more detail above, although other techniques may be used to detect a possible reporting event in other embodiments.

After detecting the possible reporting event, the controller 22 waits for at least a predefined period of time before determining whether to report a sensor detachment. Such period of time may be sufficiently long (e.g., several minutes) to allow the sensor 15 to be reattached to the equipment 12 if the detachment is associated with a non-reporting event, such as maintenance of the sensor 15 or equipment being monitored. After the controller 22 determines that such period has expired in block 105 of FIG. 10, the controller 22 further waits until the controller 22 confirms, in block 108, that the equipment 12 is currently operating, as indicated by sensor data from the sensor 88. When the equipment 12 is determined to be operating based on the sensor 88, the controller 22 analyzes the sensor data from the sensor 15 to determine whether it is consistent with the equipment 12 while operating, such as exhibiting vibrations above a predefined level or includes another operational signature of the equipment 12. If so, the controller 22 determines that the sensor 15 is reattached to the equipment 12 and, therefore, that the original detachment of the sensor 15 is associated with a non-reporting event, as shown by blocks 111 and 115 in FIG. 10. In such case, the controller 22 refrains from transmitting a certain message (e.g., an alarm).

However, if the controller 22 is unable to confirm that the sensor 15 is attached to the equipment 12 based on the sensor data from the sensor 15, then the controller 22 is configured to determine that the sensor 15 has not been reattached to the equipment 12 and, therefore, that the original detachment of the sensor 15 is associated with a reporting event, as shown by block 122 of FIG. 10. In such case, the controller 22 transmits a certain message to a user (e.g., an alarm indicating that the sensor 15 is detached from the equipment 12 monitored by the sensor 15), as shown by block 125 of FIG. 10.

Note that, if at any point after the detection of the possible reporting event in block 101 the controller 15 identifies an operational pattern of the equipment 12 in the signature data from the sensor 15, then it is unnecessary for the controller 22 to wait on confirmation from the sensor 88 that the equipment 12 is operating before deciding that the original detachment is associated with a non-reporting event, as shown by blocks 131-133 of FIG. 10.

In some embodiments, the controller 22 may be configured to confirm whether the equipment 12 is operating based on sources other than the sensor 88. As an example, the controller 22 may be configured to communicate with the equipment 12, which simply informs the controller 22 when it is operating.

In addition, as shown by block 137 of FIG. 10, after determining that a non-reporting event has occurred, the controller 22 may be configured to adjust reference values that are used to sense possible occurrences of reporting events. As an example, to detect a possible occurrence of a reporting event, the controller 22 may be configured to compare an operational parameter sensed by the sensor 15 to predefined reference values. For example, as described in more detail above, the controller 22 may be configured to determine the orientation of the sensor 15 from the sensor data and compare the determined orientation to one or more reference values, such as reference values indicating an expected range for the sensor 15. When the sensor 15 is reattached, these reference values may be updated to account for a change to the orientation or position of the sensor after reattachment.

As an example, when the sensor 15 is reattached to the equipment 12, the orientation of the sensor 15 may be different than its orientation prior to the detachment that triggered a detection of a possible reporting event in block 101. That is, after a sensor 15 is removed from the equipment 12 and the later reattached, it may not be reattached in the exact same orientation as prior to removal. Thus, the controller 22 may update the reference values used to detect a possible reporting event to account for this orientation difference. In some embodiments, the controller 22 may determine the sensor's orientation after reattachment based on the measurements by the sensor 15 and assume that this orientation is now the new normal orientation of the sensor 15. The controller 22 may then update the reference values such that a possible reporting event is detected if the orientation of the sensor 15 changes by a certain amount from its current orientation. Yet other techniques for updating reference values may be used in other embodiments.

After a non-reporting event is detected in block 115 or 133, it may be desirable for the controller 22 to cancel or otherwise resolve any notifications that may have been sent previously. As an example, if the controller 22 is configured to send an alert to notify a user that a reporting event has been detected but then thereafter determines that the sensor 15 has been reattached to the equipment 12, the controller 22 may be configured to take an action to mitigate the previous alert, such as cancelling the previous alert or sending a notification that the reporting event has been resolved.

Notably, in some embodiments when the sensors 15, 88 are configured to sense the same or similar operational parameter of the equipment 12, the controller 22 may be configured to compare the sensor data from the sensor 15 to the sensor data from the sensor 88 in order to determine whether the sensor 15 is attached to the equipment 12. In this regard, if the controller 22 determines that the equipment 12 is operating based on the sensor data from the sensor 88, then the controller 22 may compare the sensor data from the sensor 15 to the sensor data from the sensor 88 to determine whether there is a correspondence between such sensor data indicating that the sensor data from the sensor 15 is affected by operation of the equipment 12 in a similar way as the sensor data from the sensor 88. As an example, the controller 22 may compare vibration amplitude and frequency changes sensed by sensor 15 to vibration amplitude and frequency changes sensed by the sensor 88 to determine if they are sufficiently similar to suggest that the equipment 12 is changing the orientation of the sensor 15 in the same or similar way as the orientation of the sensor 88. If so, the controller 22 may determine that the sensor 15 is attached to the equipment 12. If not, the controller 22 may determine that the sensor 15 is not attached to the equipment 12.

Some equipment may exhibit high correlation of vibration in a certain direction or plane. As an example, a rotating piece of equipment 12 might cause significant vibration amplitude changes in a particular plane with very little vibration amplitude changes in a direction orthogonal to the plane. Detection of significant vibration amplitude changes within certain plane (e.g., changes exceeding a predefined threshold) with relatively small vibration amplitude changes along a direction orthogonal to the plane may be an operational signature of the equipment 12 that can be used to sense whether the sensor 15 is attached to the equipment 12 according to the techniques described above.

In some embodiments, the controller 22 may use artificial intelligence to learn the operational signatures of the equipment 12. In this regard, the controller 22 may implement a machine learning neural network that is trained to recognize vibrational other operational patterns of the equipment 12 based on historical training data obtained from similar equipment 12.

In addition, operational signatures have generally been described above in the context of vibrational patterns sensed by a sensor 15 comprising an accelerometer. However, other types of operational signatures are possible. As an example, the senor 15 may be configured to measure a temperature of the equipment 12, and when the equipment 12 is operating, it may exhibit temperature fluctuations in a certain recognizable pattern. Based on the temperature profile sensed by the sensor 15, the controller 22 may be configured to identify a signature of the equipment 12, thereby indicating that the sensor 15 is attached to the equipment 12 similar to vibrational profiles described above. Yet other changes and modification to the disclosed embodiments are possible.

Now, therefore, the following is claimed:

1. A system, comprising:
a first sensor attached to equipment for sensing vibrations of the equipment, the first sensor configured to provide first sensor data indicative of the vibrations of the equipment during a first time period and second sensor data indicative of vibrations sensed by the first sensor during a second time period;
a second sensor attached to the equipment for sensing a parameter indicative of operation of the equipment; and
a controller configured to receive the first sensor data and the second sensor data from the first sensor, the controller configured to determine at least one parameter indicative of an operational performance of the equipment based on the first sensor data and to identify a vibrational signature within the second sensor data, the controller further configured to compare the second sensor data with sensor data from the second sensor for determining an extent to which the second sensor data is correlated with the sensor data from the second sensor, the controller configured to make a determination, based on the identified vibrational signature and the extent to which the second sensor data is determined by the controller to be correlated with the sensor data from the second sensor, whether the first sensor is likely detached from the equipment and to determine whether to transmit a message for notifying a user that the first sensor is detached from the equipment based on the determination, wherein the controller is configured to assess the operational performance of the equipment based on the at least one parameter and take at least one predefined action in response to assessment of the operational performance by the controller for notifying a user of the assessment.

2. The system of claim 1, wherein the controller is configured to detect an event associated with detachment of the first sensor from the equipment and to evaluate the second sensor data subsequent to the event for determining whether to transmit the message in response to the event.

3. The system of claim 2, wherein the controller, in evaluating the second sensor data, is configured to determine based on the second sensor data whether the detachment of the first sensor from the equipment is intentional and to refrain from transmitting the message if the detachment is determined to be intentional.

4. The system of claim 2, wherein the controller is configured to transmit the message if evaluation of the second sensor data indicates that the event is not associated with intentional removal of the first sensor from the equipment by a user.

5. A system, comprising:
a first sensor attached to equipment for sensing vibrations of the equipment, the first sensor configured to provide first sensor data indicative of the vibrations of the equipment during a first time period and second sensor data indicative of vibrations sensed by the first sensor during a second time period; and a controller configured to receive the first sensor data and the second sensor data from the first sensor, the controller configured to determine at least one parameter indicative of an operational performance of the equipment based on the first sensor data and to identify a vibrational signature within the second sensor data, the controller further configured to determine an orientation of the first sensor based on the second sensor data and make a determination, based on the identified vibrational signature and the orientation, whether the first sensor is likely detached from the equipment, wherein the controller is configured to determine whether to transmit a message for notifying a user that the first sensor is detached from the equipment based on the determination, and wherein the controller is configured to assess the operational performance of the equipment based on the at least one parameter and take at least one predefined action in response to assessment of the operational performance by the controller for notifying a user of the assessment.

6. The system of claim 1, wherein the controller is configured to determine a value indicative of motion of the first sensor based on the second sensor data, and wherein the controller is configured to determine whether the first sensor is likely detached from the equipment based on the value.

7. The system of claim 6, wherein the controller is configured to compare the value to a threshold.

8. The system of claim 1, wherein the vibrational signature is associated with operation of the equipment.

9. A system, comprising:
a first sensor attached to equipment for sensing vibrations of the equipment, the first sensor configured to provide first sensor data indicative of the vibrations of the equipment during a first time period and second sensor data indicative of vibrations sensed by the first sensor during a second time period; and
a controller configured to receive the first sensor data and the second sensor data from the first sensor, the controller configured to determine at least one parameter indicative of an operational performance of the equipment based on the first sensor data and to identify a vibrational signature within the second sensor data, the controller further configured to identify, within the second sensor data, a signature indicating a falling or swinging motion of the first sensor and make a determination, based on the identified vibrational signature and the identified signature indicating the falling or swinging motion, whether the first sensor is likely detached from the equipment, wherein the controller is configured to determine whether to transmit a message for notifying a user that the first sensor is detached from the equipment based on the determination, and wherein the controller is configured to assess the operational performance of the equipment based on the at least one parameter and take at least one predefined action in response to assessment of the operational performance by the controller for notifying a user of the assessment.

10. A method, comprising:
receiving, at a controller, first sensor data from a first sensor attached to equipment for sensing vibrations of the equipment;
receiving, at the controller from the first sensor, second sensor data indicative of vibrations sensed by the first sensor;
receiving, at the controller from a second sensor attached to the equipment, third sensor data indicative of operation of the equipment;

determining, with the controller, at least one parameter indicative of an operational performance of the equipment based on the first sensor data;
identifying, with the controller, a vibrational signature within the second sensor data;
determining, with the controller, an extent to which the second sensor data is correlated with the third sensor data;
detecting, with the controller based on the identified vibrational signature and the extent to which the second sensor data is determined to be correlated with the third sensor data, that the first sensor is likely detached from the equipment;
determining, with the controller, whether to transmit a message for notifying a user that the first sensor is detached from the equipment based on the detecting;
assessing, with the controller, the operational performance of the equipment based on the at least one parameter; and
performing at least one predefined action in response to the assessing.

11. The method of claim 10, wherein the vibrational signature is associated with operation of the equipment.

12. The method of claim 10, wherein the detecting comprises detecting an event associated with detachment of the first sensor from the equipment, and wherein the method further comprises evaluating, with the controller, the second sensor data subsequent to the detected event for determining whether to transmit the message.

13. The method of claim 12, wherein the determining comprises determining not to transmit the message if the evaluating indicates that the event is associated with intentional removal of the first sensor from the equipment by a user.

14. The method of claim 12, wherein the determining comprises determining to transmit the message if the evaluating indicates that the event is not associated with intentional removal of the first sensor from the equipment by a user.

15. The system of claim 9, wherein the first sensor is attached to a tether such that the first sensor swings by the tether when the first sensor detaches from the equipment, and wherein the identified signature indicates the swinging motion.

16. A system, comprising:
a first sensor attached to equipment for sensing vibrations of the equipment, the first sensor configured to provide first sensor data indicative of the vibrations of the equipment during a first time period and second sensor data indicative of vibrations sensed by the first sensor during a second time period; and
a controller configured to receive the first sensor data and the second sensor data from the first sensor, the controller configured to determine at least one parameter indicative of an operational performance of the equipment based on the first sensor data and to identify a vibrational signature within the second sensor data, the controller further configured to make a determination, based on the identified vibrational signature, whether the first sensor is likely detached from the equipment and to determine whether to transmit a message for notifying a user that the first sensor is detached from the equipment based on the determination, wherein the controller is configured to assess the operational performance of the equipment based on the at least one parameter and take at least one predefined action in response to assessment of the operational performance by the controller for notifying a user of the assessment, and wherein the vibrational signature is defined by a predefined pattern of amplitudes and frequencies resulting from operation of the equipment.

17. The system of claim 9, wherein the identified signature indicates the swinging motion.

18. The method of claim 10, wherein the assessing comprises detecting a fault condition for the equipment.

19. The system of claim 16, wherein the controller is configured to determine that the first sensor is likely detached from the equipment in response to an absence of the vibrational signature in sensor data received from the first sensor within a window of time.

20. The system of claim 19, further comprising a second sensor attached to the equipment for sensing a parameter indicative of operation of the equipment, wherein the controller is configured to determine that the first sensor is likely detached from the equipment based on the absence and sensor data received from the second sensor within the window of time, and wherein the sensor data received from the second sensor indicates that an operation of the equipment associated with the vibrational pattern occurred in the window of time.

21. The system of claim 5, wherein the controller is further configured to determine a direction of gravity based on the first sensor data or the second sensor data, and wherein the controller is configured to determine the orientation of the first sensor relative to the direction of gravity based on the second sensor data.

* * * * *